United States Patent [19]

Hughes et al.

[11] Patent Number: 5,357,507

[45] Date of Patent: Oct. 18, 1994

[54] FAST CONNECTION ADMISSION CONTROL FOR ATM NETWORKS

[75] Inventors: David A. Hughes; Manabu Kato, both of Tokyo, Japan

[73] Assignee: Northern Telecom Limited, Montreal, Canada

[21] Appl. No.: 110,998

[22] Filed: Aug. 24, 1993

[51] Int. Cl.$^5$ .......................... H04J 3/12; H04J 3/22
[52] U.S. Cl. ...................... 370/60; 370/94.1
[58] Field of Search .............. 370/94.1, 60, 60.1, 370/54, 85.6, 58.2, 61, 58.1; 340/825.06

[56] References Cited

U.S. PATENT DOCUMENTS

| | | | |
|---|---|---|---|
| 4,984,264 | 1/1991 | Katsube | 370/54 |
| 5,153,877 | 10/1992 | Esaki et al. | 370/60 |
| 5,166,894 | 11/1992 | Saito | 370/94.1 |

OTHER PUBLICATIONS

Murase, T., et al., "A Call Admission Control Scheme for ATM Networks Using a Simple Quality Estimate", *IEEE Journal on Selected Areas in Communications*, vol. 9, pp. 1461–1470, Dec. 1991.

Rasmussen, C., et al., "Source–Independent Call Acceptance Procedures in ATM Networks", *IEEE Journal on Selected Areas in Communications*, vol. 9, No. 3, pp. 351–358, Apr. 1991.

Hui, J., "Resource Allocation for Broadband Networks", *IEEE Journal on Selected Areas in Communications*, vol. 6, No. 9, pp. 1598–1608, Dec. 1988.

Appleton, J., "Modelling a Connection Acceptance Strategy for Asynchronous Transfer Mode Networks", 7th ITC Specialist Seminar, New Jersey, Oct. 1990.

Cost 224 "Performance Evaluation and Design of Multiservice Networks", Final Report of COST 224 Project, Editor J. W. Roberts, Commission of the European Communities EUR14152EN, Oct. 1991 pp. 108–110, pp. 154–157.

Miyao, Y., "A Dimensioning Scheme in ATM Networks", *Networks '92 Kobe*, pp. 171–176, May 1992.

*Primary Examiner*—Douglas W. Olms
*Assistant Examiner*—Huy D. Vu
*Attorney, Agent, or Firm*—Foley & Lardner

[57] ABSTRACT

Connection admission control (CAC) is a key traffic control function for future asynchronous transfer mode (ATM) networks. It is required to determine whether or not the network has sufficient resources to accept a new connection. This decision is based on the predicted quality of service after accepting the new connection. A connection admission control method of the present invention is faster and/or more accurate than other methods which have been proposed. It involves pre-computing an upper and lower bounds to an admission surface. Calls can be accepted when the operating point is below the lower bound. Calls must be rejected when the operating point is above the upper bound. A more detailed method for deciding whether to accept the connection when the operating point is between the two bounds is also disclosed.

8 Claims, 3 Drawing Sheets

FAST CONNECTION ADMISSION CONTROL FOR ATM NETWORKS

FIELD OF THE INVENTION

The present invention relates generally to ATM networks. In particular, it is directed to a new connection admission control for ATM networks.

BACKGROUND OF THE INVENTION

Asynchronous transfer mode (ATM) is a connection oriented, cell based switching technique and is attracting a great deal of interest in the field of telecommunications. Networks based on the ATM switching technique promise flexible, high speed communication capability.

In existing telephone networks, new connection requests are blocked on the basis of a shortage of trunks. In an ATM node this is not the case since the physical resources are allocated virtually, and shared by many connections. However because the resources are shared, some limit must be placed on the number of simultaneous connections which are carried in order to maintain an acceptable quality of service.

Connection Admission Control (CAC) is the traffic control function of an ATM network, responsible for accepting and blocking calls to maintain an acceptable quality of service while maximizing network utilization. At call set-up a traffic contract is negotiated between the user and the network. The user declares a set of traffic descriptors (or equivalently a single traffic class descriptor) and a required quality-of-service (QOS). Based on these parameters and existing network load, the call may be accepted or rejected, usually based on a quality of service prediction.

Traffic from a number of calls is multiplexed together at a multiplexer or in a switch onto a single resource of capacity C bits per second (bps). This capacity might relate to a physical quantity such as a link capacity, or a virtual quantity such as a virtual path (VP) bandwidth allocation. Because the aggregate incoming traffic can exceed the outgoing capacity C, some of the traffic must be discarded resulting in cell loss. Among many indicators, e.g. cell delay, cell jitter etc., the cell loss is the most important QOS indicator with respect to connection admission. In order to make a connection admission decision some model of the system must be employed in order to derive a measure indicative of a predicted cell loss probability. The measure is based on traffic descriptors (parameters) for each call which the user declares at each call set-up. Burst traffic can be modelled as on-off traffic and described by three parameters; peak rate, mean rate and burst length. A measure based on the bufferless multiplexer model is simply calculated by two parameters of peak rate and mean rate which are easy for a user to declare and for the network to enforce. The control model of the present invention uses this simple bufferless multiplexer model. Use of this kind of model, both to represent ATM switching processes, and as a basis for connection admission, has been reported in recent literature. T. Murase, H. Suzuki, S. Sato, T. Takeuchi, "A call admission control scheme for ATM networks using a simple quality estimate", IEEE JSAC, vol. 9, no. 9, pp 1461-1470, December 1991, and C. Rasmussen, J. H. Sorenson, K. S. Kvols, S. B. Jacobsen, "Source independent call acceptance ATM networks", IEEE JSAC, vol 9, no. 3, pp 351-358, April 1991. However fast and accurate methods to solve this model have until this time been unreported.

OBJECTS OF THE INVENTION

Therefore it is an object of the present invention to provide a method of controlling admission of a call to an ATM network.

It is a further object of the present invention to provide a method of controlling admission of a call to an ATM network which is fast.

It is another object of the present invention to provide a method of controlling admission of a call to an ATM network which uses a fast cell loss estimation technique.

It is yet another object of the present invention to provide a method of controlling admission of a call to an ATM network which accurately controls quality of service on the link.

SUMMARY OF THE INVENTION

Briefly stated, the present invention resides in an ATM network system for handling traffic having K classes of calls where K is a positive integer. According to one aspect, the present invention is directed to a method of managing the ATM network system by controlling admission of a call to the ATM network system whose operating point is expressed by $n = \{n_1, n_2 \ldots n_K\}$ in a K dimensional coordinate system having K axes, where each axis represents the number of calls of a class and $n_k$ is the number of calls in class k, $k=1$ to K. The method includes setting, at initialization or reinitialization of the ATM network system, in the K dimensional coordinate system, lower and upper planes, below which lower plane the ATM network system always has an acceptable quality-of-service parameter and above which upper plane the ATM network system always has an unacceptable quality of service parameter, and receiving a call connect request of the call specifying its class descriptors.

The method further includes obtaining an operating point of the ATM network system, assuming that the call is admitted to the ATM network system and determining that the ATM network system will have an acceptable quality-of-service parameter if the operating point is between the upper and lower planes and an estimated cell loss probability f of the ATM network system is less than a preset target long term cell loss probability, the estimated cell loss probability f being obtained from the following equation:

$$f = \frac{e^{\mu(s) - sC}}{s^2 E(x) \sqrt{2\pi \mu''(s)}}$$

where $E(x)$ is the average aggregate arrival rate, C is the capacity of the ATM network system and s satisfies the following equation, $$\mu'(s) = c$$

wherein $\mu(s)$ is defined by $$\mu(s) = \sum_{k=1}^{K} n_k \mu_k(s)$$

where $\mu_k(s)$ is the skewed expectation for a single source of class k, and $\mu'(s)$ and $\mu''(s)$ are the derivatives of $\mu(s)$.

Finally, the method includes admitting the call to access the ATM network system if the ATM network system is determined to have an acceptable quality of service parameter.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS OF THE INVENTION

Figure 1:
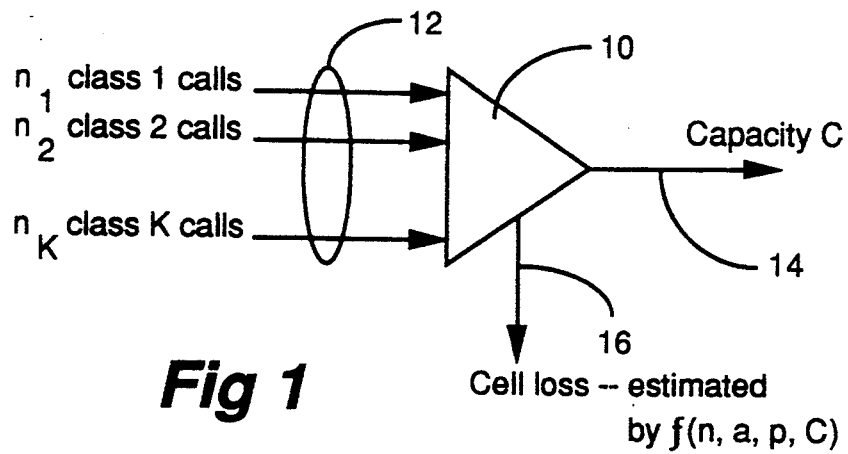
FIG. 1 shows a system model which involves a bufferless multiplexer.

FIG. 1 shows the system model which is a simple bufferless multiplexer 10 handling K (a positive integer) classes of calls. In the figure, $n_k$ represents the number of calls of class k. Traffic from a number of calls is multiplexed at a multiplexer 10 onto a single output port 14 of capacity C.

Each call is described by a set of traffic descriptors. The present invention, for example, uses a peak rate and an average rate. Calls are grouped with the same parameters into classes such that all calls in class k have a peak rate $p_k$ and an average rate $a_k$. Thus the class descriptors for a model with K classes can be summarized by the two vectors:

$$p = \{p_1, p_2, \ldots p_K\} \text{ and } a = \{a_1, a_2, \ldots a_K\} \quad (1)$$

An operating point of the network system is defined by a description of the number of calls in each class. For a system with K classes, the operating point can be represented by the vector in a K dimensional coordinate system $$n = \{n_1, n_2, \ldots, n_K\} \quad (2)$$

where $n_k$ is the number of calls in class k. FIG. 1 also shows the cell loss 16 which may occur in the system. The long term probability of cell loss is dependent upon variables n, a, p and C and is thus expressed as a function f(n, a, p, C). A very fast and accurate way of estimating this cell loss probability will be described later.

Figure 2:
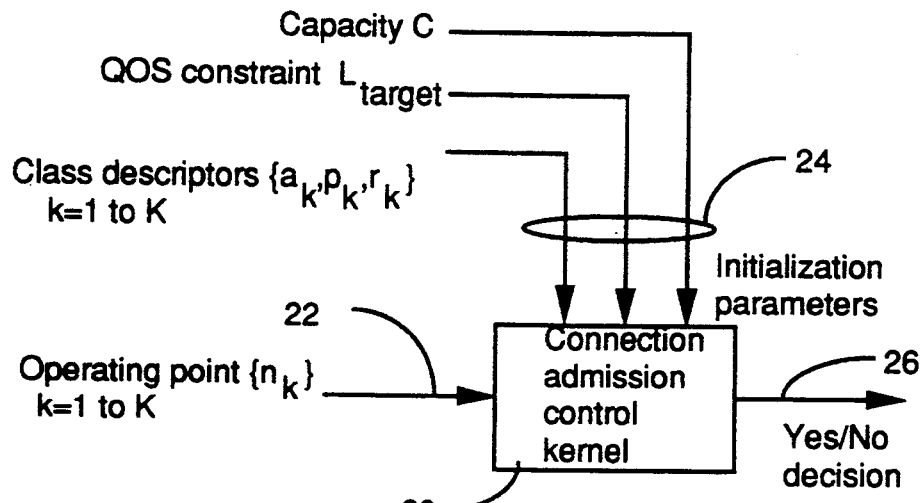
FIG. 2 is a functional block diagram of connection admission control kernel.

FIG. 2 shows the functional block diagram for the connection admission control procedure according to one embodiment of the invention. In the figure the connection admission control kernel 20 receives various inputs including initialization parameters and operating parameters.

The primary input is an operating parameter 22 indicating an operating point described by the vector $n = \{n_1, n_2, \ldots, n_K\}$ where $n_k$ is the number of calls of class k.

There are a number of additional initialization inputs 24 which are set up at initialization or reinitialization time. They are:

The capacity C of the multiplexer (in bps).

The traffic descriptors for each class k=1 to K. This consists of the peak rate $p_k$ (in bps), the average rate $a_k$ (in bps).

A quality-of-service (QOS) constraint expressed as a target long term cell loss probability $L_{target}$.

An additional class descriptor, the expected load $r_k$ for each class k, is also used. The expected load is defined as the expected arrival rate of calls of class k, measured as arrivals per second times the expected holding time (in seconds) for calls of class k.

The output 26 of the connection admission control kernel 20 is a simple yes/no answer to the question:

"Is the cell loss probability at this operating point (as predicted by the loss estimation function) less than the target QOS constraint $L_{target}$?"

Figure 3:
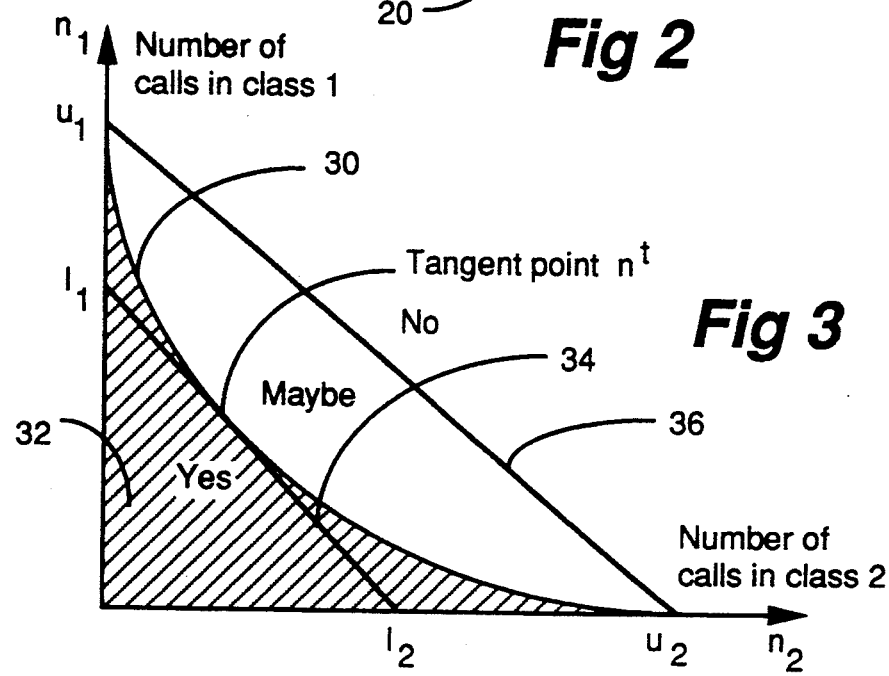
FIG. 3 illustrates a typical admission region for two traffic classes showing the admission boundary and the upper and lower planes used to accelerate the admission decision according to the present invention.

The operation of the admission control kernel can be best described with reference to FIG. 3 which shows a typical admission region for two traffic classes. Each axis in an x-y coordinate indicates the number of calls in a class. The operating point of this system can be expressed as a dot in the figure by a vector $\{n_1, n_2\}$. The figure shows an admission boundary 30 and a shaded area 32 indicates acceptable combinations of calls $\{n_1, n_2\}$ such that $f(n, a, p, C) \leq L_{target}$.

One possible method for making the admission decision is to evaluate this loss estimation function each time the admission kernel is called. However, according to one embodiment of the present invention that decision is speeded up by precomputing a lower plane 34 below which the system is always judged to have an acceptable QOS, that is to say, an estimated cell loss probability is expected to be below the target QOS constraint $L_{target}$. In another embodiment, an upper plane 36, above which the system is always judged to have an unacceptable QOS, is also precomputed, These planes are loaded at an initialization or at reinitialization. Because of the simple geometry of planes, it is very simple to determine if an operating point lies below the lower plane (in the "yes" region), above the upper plane (in the "no" region) or between the two (in the maybe region). Thus according to a yet another embodiment, in the case where an operating point lies between the planes, the cell loss estimation function must be evaluated to get a definite yes or no. Detailed computations of planes and cell loss estimation will be discussed below. Once the system is judged to have either an acceptable or unacceptable QOS, a decision to admit or block a call may be made according to the QOS. In other instances the system operator may use additional factors which have no bearing to the present invention before a call is actually accepted or denied. It should be noted that although FIG. 3 relates to two dimensions (K=2), (thus a plane connecting two axis intercepts is a straight line), this procedure is valid and can be defined for an arbitrary number of dimensions. Where K=m (m being a positive integer), a plane connecting m axis intercepts is a flat plane in m dimensional space.

The Fast Cell Loss Estimation Method

Here, the loss estimation function is described in detail. A mathematical description is given first and is followed by a software implementation oriented description.

This technique is based on the theory of large deviations. The idea of applying large deviations theory to ATM modelling has been reported in J. Y. Hui, "Resource allocation for broadband networks", IEEE JSAC, vol. 6, no. 9, pp 1598–1608, December 1988, J. Appleton, "Modelling a connection acceptance strategy for asynchronous transfer mode", 7th ITC Specialist Seminar, New Jersey, October 1990, COST224 "Performance evaluation and design of multiservice networks" Final Report of COST 224 Project, Editor J. W. Roberts, Commission of the European Communities EUR14152EN, October 1991, and Y. Miyao, "A dimensioning scheme in ATM networks" Networks 92, Kobe, pp 171–176, May 1992. However, no prior art techniques have suggested the use of the tangential plane and the combined use of the on-off source traffic model and a sharpening factor to obtain a fast and extremely accurate solution to the admission problem under consideration.

Mathematical Description

The loss is calculated using the following formula $$f = \frac{e^{\mu(s)-sC}}{s^2 E(x) \sqrt{2\pi \mu''(s)}} \quad (3)$$

where s is chosen such that $$\mu'(s) = C \quad (4)$$

The quantity $$\frac{1}{s^2 E(x) \sqrt{2\pi \mu''(s)}}$$

is the sharpening factor and the term $e^{\mu(s)-sC}$ is called the Chernoff bound.

The average aggregate arrival rate is $$E(x) = \sum_{k=1}^{K} n_k a_k \quad (5)$$

The function $\mu(s)$ and its derivatives are defined as follows $$\mu(s) = \sum_{k=1}^{K} n_k \mu_k(s) \quad (6)$$

where $\mu_k(s)$ is called the skewed expectation for a single source of class k and is defined by equation (7) below. It is assumed here that the system is a superposition of on-off sources for which $$\mu_k(s) = \log[(a_k/p_k)(e^{s*P_k} - 1) + 1] \quad (7)$$

When s becomes very large, numerical overflows can result from evaluating this expression directly. In this case it is best to use the limiting approximation $$\lim_{s \to \infty} \mu_k(s) = \log(a_k/p_k) * s * p_k \quad (8)$$

Differentiating $\mu(s)$ with respect to s to get, $$\mu'(s) = \sum_{k=1}^{K} n_k \mu'_k(s) \quad (9)$$

where $$\mu'_k(s) = [(a_k/p_k)(e^{s*P_k} - 1) + 1]^{-1}(a_k e^{s*P_k}) \quad (10)$$
$$= a_k e^{(s*P_k - \mu_k(s))}$$

where $$\mu'_k(s) = [(a_k/p_k)(e^{s*P_k}-1)+1]^{-1}(a_k e^{s*P_k}) = a_k e^{(s*P_k - \mu_k(s))} \quad (10)$$

Differentiating again to obtain $$\mu'' = \sum_{k=1}^{K} n_k \mu''_k(s) \quad (11)$$

where $$\mu''_k(s) = a_k e^{(s*P_k - \mu_k(s))} * (p_k - \mu'_k(s)) \quad (12)$$
$$= \mu'_k(s) * (p_k - \mu'_k(s))$$

Algorithmic Description $$E(x) = \sum_{k=1}^{K} n_k a_k$$

$$\max(x) = \sum_{k=1}^{K} n_k p_k$$

$s$ = initial guess e.g. $s = 1/2C + 1/2(\max(x))$
do
   improve guess for $s$ e.g. using a Newton/Bisection method
   for $k = 1$ to $K$
     if $s*p_k < 100$, $\mu_k(s) = \log[(a_k/p_k)(e^{s*P_k} - 1) + 1]$
     else $\mu_k(s) = \log(a_k/p_k)*s*p_k$
     $\mu'_k(s) = a_k e^{(s*P_k - \mu_k(s))}$
     $\mu''_k(s) = \mu'_k(s) * (p_k - \mu'_k(s))$
   endfor $$\mu'(s) = \sum_{k=1}^{K} n_k \mu'_k(s)$$

until $\mu'(s) \approx C$ $$\mu(s) = \sum_{k=1}^{K} n_k \mu_k(s)$$

$$\mu''(s) = \sum_{k=1}^{K} n_k \mu''_k(s)$$

$$f = \frac{e^{\mu(s)-sC}}{s^2 E(x) \sqrt{2\pi \mu''(s)}}$$

Figure 4:
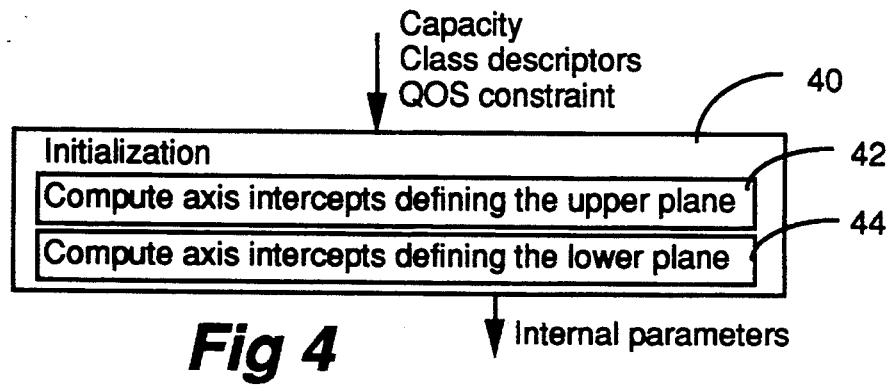
FIG. 4 shows a program structure for initialization.
Figure 5:
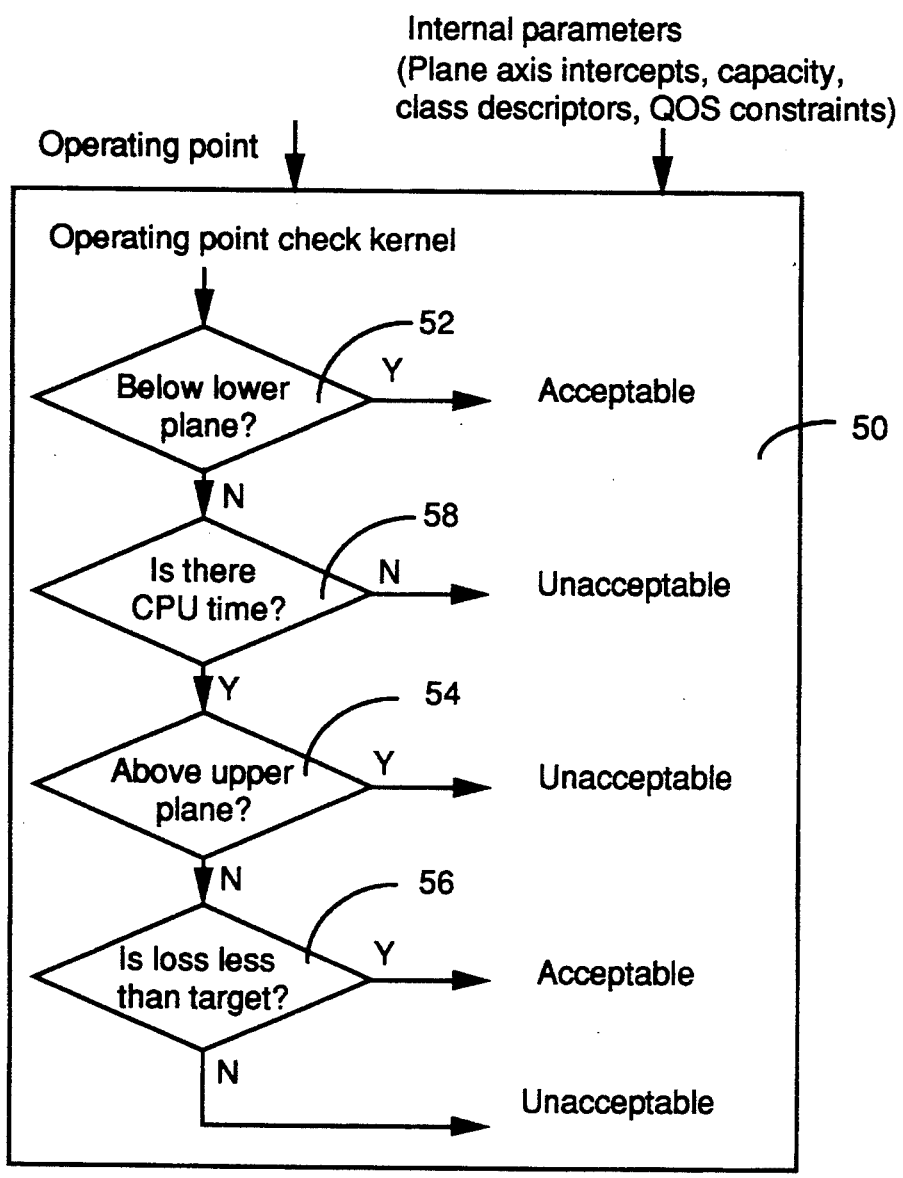
FIG. 5 shows a program structure for the operating point check kernel.
Figure 6:
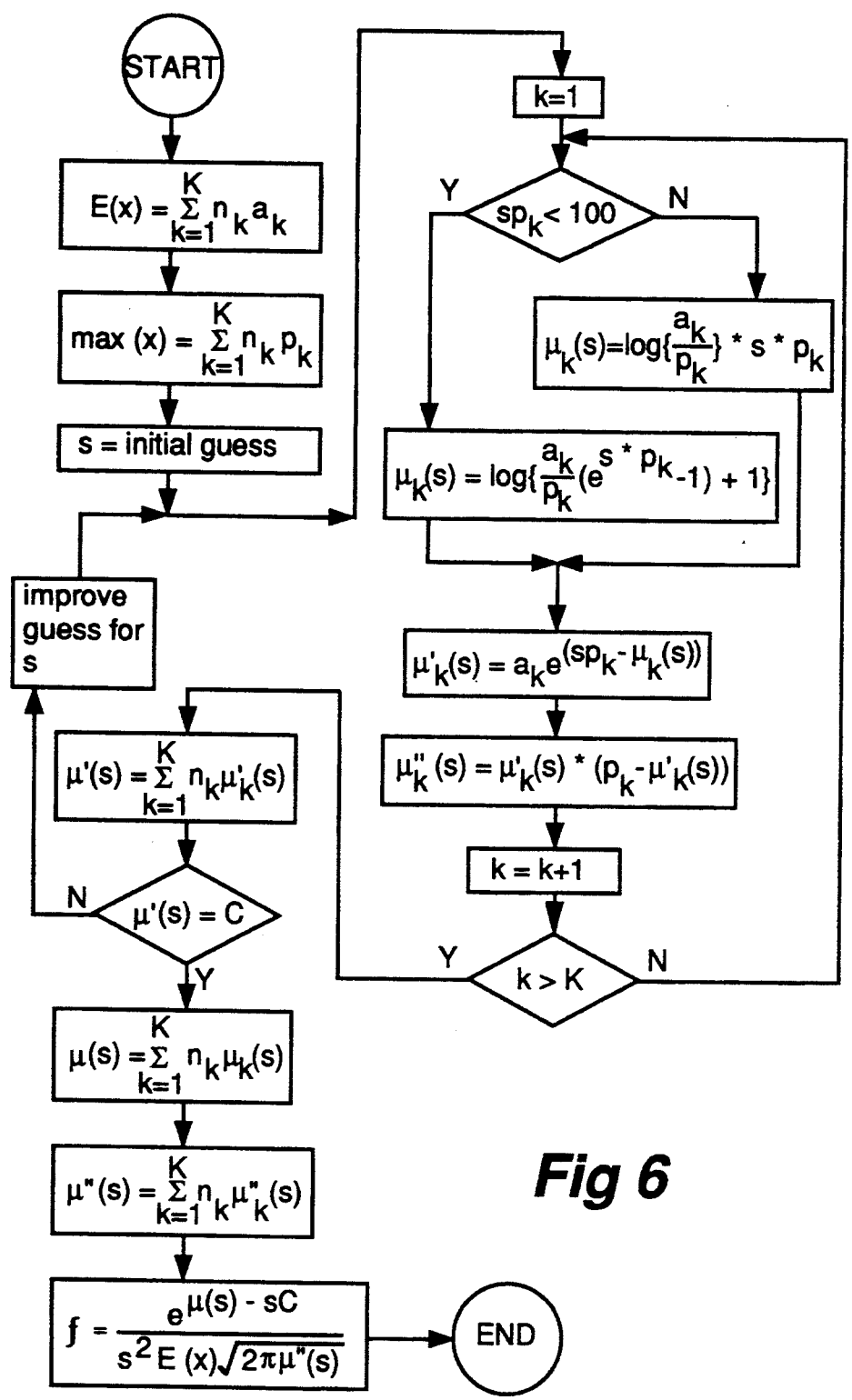
FIG. 6 is a flow chart of the fast cell loss estimation method according to the present invention.

The structure of an admission kernel based on the present invention is depicted in FIGS. 4 and 5. There are two main parts: (i) The initialization part (illustrated in FIG. 4) which takes the initialization parameters and computes the axis intercepts for the upper and lower planes $u_k$ and $l_k$. (ii) The operating point check part (illustrated in FIG. 5) which gives a yes/no answer on whether the given operating point is acceptable or not.

Initialization

Referring to FIG. 4, initialization 40 involves computing axis intercepts defining the upper and lower planes, as shown by boxes 42 and 44 respectively.

(i) Determining the upper plane (box 42)

To determine the upper plane, the axis intercepts of the admission boundary with each of the K axes are calculated and then a plane connecting the intercepts is defined by $\{u_i\}$. The basic technique used for this is iteration.

```
for k = 1 to K
    u_k = initial guess
    do
        improve guess for u_k
    until f(u_k, a_k, p_k, C) ≈ L_target
endfor
```

In the present implementation a combined Bi-section/-Newton iteration method is used.

(ii) Determining the lower plane (box 44)

To determine the lower plane, a plane which is tangent to the admission boundary at an operating point $n^t$ is obtained. The point $n^t$ is chosen such that it is optimally placed with respect to minimising the number of situations where a "maybe" arises, given expected traffic load $r_k$ for each class k.

Following is a description of: (a) how to choose the tangent point $n^t$ and (b) how to compute the axis intercepts representing the tangent plane, given $n^t$.

(a) Choosing the tangent point

The optimal tangent point lies at the intersection of the admission boundary and the line which travels through the origin and a point which represents the expected traffic loads $r_k$ for each class k. This line can be investigated via a scalar value t, and the basic technique used to find the t corresponding to the intersection point is iteration.

```
t = initial guess
do
    improve guess for t
    n^t = tr
until f(n^t, a, p, C) ≈ L_target
```

In the present implementation, a combined Bi-section/-Newton iteration method is also used.

(b) Computing the tangent plane

The axis intercepts defining the lower plane are computed as follows. Define the log of the loss estimation function described in Equation 3.

$$Q = \log f = \mu(s) - sC - \log E(x) - 2\log s - \log(2\pi\mu''(s))/2 \quad (13)$$

To find the tangent to the admission boundary at the point $n^t$, it is necessary to evaluate $$\frac{\delta Q}{\delta n_k^t} = \mu_k(s) - \frac{a_k}{E(x)} - \frac{\mu''_k(s)}{2\mu''(s)} \quad (14)$$

Following from Equation 14, it is then possible to obtain the axis intercepts of the tangent plane.

$$l_k = \left[\frac{\delta Q}{\delta n_k^t}\right]^{-1} \sum_{i=1}^{K} n_i^t \frac{\delta Q}{\delta n_i^t} \quad (15)$$

A similar technique but without the use of the sharpening factor is described in the above-referenced article by Miyao in Networks 92.

Operating Point Check

Referring to FIG. 5, the operating point check 50 with respect to the upper and lower planes is performed at every call set-up. When the operating point is found to lie between the planes, the cell loss estimate is calculated using the technique hitherto described in the disclosure.

(i) The lower plane check at 52

The following equation is used to check whether an operating point is below the lower plane.

$$\sum_{i=1}^{K} (n_i/l_i) < 1 \quad (16)$$

If Equation 16 is true, the operating point $n = \{n_1, n_2, \ldots, n_K\}$ is classed acceptable.

(ii) The upper plane check at 54

The following equation is used to check whether an operating point is above the upper plane.

$$\sum_{i=1}^{K} n_i/u_i > 1 \quad (17)$$

If Equation 17 is true, the operating point $n = \{n_1, n_2, \ldots, n_K\}$ is classed unacceptable.

(iii) Resolving the maybe case at 56

Following is a description of the method used to determine a yes or no answer in the case where the operating point lies between the lower and upper planes. The check then involves calling the loss function described above, which is $$f(n, a, p, C) < L_{target} \quad (18)$$

If Equation 18 is true then the operating point n is classed as acceptable, otherwise it is unacceptable.

(iv) If computation time is constrained, it is possible, as a further embodiment, to insert a stage 58 in which the CPU time is monitored.

As mentioned thus far, resolving the maybe case requires more computation than the plane checks and therefore there may be a case where a call may be rejected if available computation time is not sufficient.

According to another embodiment, a certain simplified version is adequate. This involves elimination of cell loss estimation calculation. This is possible because although the means for computing the estimated cell loss (described above) is very fast, it is much slower relatively speaking than checking where an operating point lies with respect to the two planes. Thus in this embodiment the maybe case is always assumed unacceptable. This makes the upper plane check and the cell estimation steps unnecessary. Operating point check with respect only to the lower plane to decide the system to have an acceptable quality-of-service will shed a large computing load and will be particularly beneficial to a system whose computing resources responsible for running the admission kernel are heavily loaded. Because of the near linearity of the true boundary, and the optimal placement of the tangent, the utilization loss would be relatively small.

We claim:

1. In an ATM network system for handling traffic having K classes of calls to the ATM network where K is a positive integer, a method for managing the ATM network system by controlling admission of one of said calls to the ATM network system having an operating point expressed by $n = \{n_1, n_2 \ldots n_K\}$ in a K dimensional coordinate system with K axes, where each of said axes represents the number of the calls in one of said classes and $n_k$ is the number of the calls in a class k, k=1 to K, comprising steps of:

(a) setting, at initialization or reinitialization of the ATM network system in the K dimensional coordinate system, lower and upper planes, the lower plane being a plane below which the ATM network system always has an acceptable quality-of-service parameter and the upper plane being a plane above which the ATM network system always has an unacceptable quality-of-service parameter;

(b) receiving a call connect request of one of said calls specifying a class descriptor of said one of said calls;

(c) obtaining the operating point of the ATM network system, assuming that said one of said calls is admitted to the ATM network system;

(d) determining the ATM network system as having the acceptable quality-of-service parameter if the operating point is between the upper and lower planes and an estimated cell loss probability f of the ATM network system is less than a preset target long term cell loss probability, the estimated cell loss probability f being obtained according to the relationship, $$f = \frac{e^{\mu(s)-sC}}{s^2 E(x) \sqrt{2\pi\mu''(s)}}$$

where $E(x)$ is an average aggregate arrival rate, C is a capacity of the ATM network system and s satisfies the following relationship, $$\mu'(s)=C$$

wherein $\mu(s)$ is defined by $$\mu(s) = \sum_{k=1}^{K} n_k \mu_k(s)$$

where $\mu_k(s)$ is a skewed expectation for a single source of the class k, and $\mu'(s)$ and $\mu''(s)$ are derivatives of $\mu(s)$; and (e) admitting said one of the calls to access the ATM network system whenever the ATM network system is determined to have the acceptable quality-of-service parameter.

2. The method of managing the ATM network system by controlling admission of a call to the ATM network system, according to claim 1, further comprising steps of:

(f) obtaining the operating point of the ATM network system by assuming that said one of said calls is admitted to the network system;

(g) determining the ATM network system as having the acceptable quality-of-service parameter if $$\sum_{k=1}^{K} (n_k/1_k) < 1$$

is satisfied, where $1_k$, k=1 to K, are axis intercepts of the lower plane in the K dimensional coordinate system; and (h) admitting said one of said calls to access the ATM network system.

3. The method of managing the ATM network system by controlling admission of a call to the ATM network system, according to claim 2, further comprising the steps (i) determining the ATM network system as having the unacceptable quality-of-service parameter if $$\sum_{k=1}^{K} (n_k/u_k) > 1$$

is satisfied, where $u_k$, k=1 to K, are the axis intercepts of the upper plane in the K dimensional coordinate system; and rejecting said one of said calls from accessing the ATM network system.

4. The method of managing the ATM network system by controlling admission of a call to the ATM network system, according to claim 2, further comprising a step of:

(k) determining, at initialization or reinitialization of the ATM network system, the axis intercepts $1_k$, k=1 to K describing the lower plane, by obtaining a tangent plane to an admission boundary.

5. The method of managing the ATM network system by controlling admission of a call to the ATM network system, according to claim 3, further comprising a step of:

(f) determining, at initialization or reinitialization of the ATM network system, the axis intercepts $u_k$, k=1 to K describing the upper plane, by obtaining axis intercepts of an admission boundary.

6. The method of managing the ATM network system by controlling admission of a call to the ATM network system, according to claim 1 wherein the estimated cell loss probability f is derived by a step of repetitively computing s to obtain an accurate s to satisfy $$\mu'(s)=C.$$

7. The method of managing the ATM network system by controlling admission of a call to the ATM network system, according to claim 4 wherein the step (k) further comprising steps of determining, at initialization or reinitialization, a first point, the lower plane being made tangent to the admission boundary at said first point by deriving an intersection of the admission boundary and a line travelling through an origin and a second point determined by an expected traffic load.

8. An ATM network system, comprising:

a multiplexer, said multiplexer being connected to receive a plurality of call signals grouped into K classes of call signals, where K is a positive integer, and outputting a capacity signal C representing a capacity of the ATM network system; and a connection admission controller connected to receive said capacity signal C from said multiplexer, said connection admission controller further receiving an operating point signal expressed by $n=\{n_1, n_2 \ldots n_k\}$ in a K dimensional coordinate system with K axes, each of said axes representing a number of the call signals in one of said classes, $n_k$ being a number of the call signals in a class k, k=1 to K, and a call connect request signal of one of said call signals specifying a class descriptor of said one of said call signals, said connection admission controller outputting a decision signal for deciding whether or not to admit said one of the call signals to the ATM network system based on an acceptable quality-of-service parameter, wherein said acceptable quality-of-service parameter being determined by setting, at initialization or reinitialization of the ATM network system in the K dimensional coordinate system, lower and upper planes, the lower plane being a plane below which the ATM network system always has the acceptable quality-of-service parameter and the upper plane being a plane above which the ATM network system always has an unacceptable quality-of-service parameter, and said connection admission controller determines the ATM network system as having the acceptable quality-of-service parameter if the operating point is between the upper and lower planes and an estimated cell loss probability f of the ATM network system is less than a preset target long term cell loss probability, the estimated cell loss probability f being obtained according to the relationship, $$f = \frac{e^{\mu(s)-sC}}{s^2 E(x)\sqrt{2\pi\mu''(s)}}$$

where $E(x)$ is an average aggregate arrival rate, C is the capacity of the ATM network system and s satisfies the following relationship, $\mu'(s) = C$ wherein $\mu(s)$ is defined by $$\mu(s) = \sum_{k=1}^{K} n_k \mu_k(s)$$

where $\mu_k(s)$ is a skewed expectation for a single source of the class k, and $\mu'(s)$ and $\mu''(s)$ are derivatives of $\mu(s)$.

* * * * *